United States Patent
Schafer et al.

(10) Patent No.: US 12,448,924 B2
(45) Date of Patent: Oct. 21, 2025

(54) AIRCRAFT HYBRID DUPLEX-TRIPLEX CONTROL ARCHITECTURE

(71) Applicant: RTX Corporation, Farmington, CT (US)

(72) Inventors: Bradley C. Schafer, Ellington, CT (US); Ramesh Rajagopalan, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 291 days.

(21) Appl. No.: 18/185,111

(22) Filed: Mar. 16, 2023

(65) Prior Publication Data
US 2023/0332547 A1 Oct. 19, 2023

Related U.S. Application Data

(60) Provisional application No. 63/330,418, filed on Apr. 13, 2022.

(51) Int. Cl.
*F02C 9/00* (2006.01)
*G05B 9/03* (2006.01)

(52) U.S. Cl.
CPC ............ *F02C 9/00* (2013.01); *G05B 9/03* (2013.01); *F05D 2270/301* (2013.01); *F05D 2270/303* (2013.01)

(58) Field of Classification Search
CPC ............ F02C 9/00; F05D 2270/301; F05D 2270/303; G05B 9/03
See application file for complete search history.

(56) References Cited

U.S. PATENT DOCUMENTS

| | | |
|---|---|---|
| 4,799,159 A | 1/1989 | Davidson et al. |
| 5,550,736 A | 8/1996 | Hay et al. |
| 6,480,780 B1 | 11/2002 | Schwamm |
| 6,922,625 B2 | 7/2005 | Weir et al. |
| 7,047,440 B1 | 5/2006 | Freydel et al. |
| 7,337,044 B2 | 2/2008 | Platzer et al. |
| 8,534,599 B2 | 9/2013 | Noll et al. |
| 8,972,772 B2 | 3/2015 | Beilin et al. |
| 11,203,440 B2 | 12/2021 | Veilleux, Jr. et al. |
| 11,247,768 B2 | 2/2022 | Fervel |

(Continued)

FOREIGN PATENT DOCUMENTS

EP 0807882 A2 11/1997

*Primary Examiner* — Calvin Cheung
(74) *Attorney, Agent, or Firm* — CANTOR COLBURN LLP

(57) ABSTRACT

Aircraft control architectures include a triplex sensor configured to output three signals. First and second channels are configured to receive respective signals of the three output signals, with each channel having a respective processor and are configured to output respective control signals. A remote interface device is configured to receive a third signal of the three output signals and an effector is configured to receive the first and second control signals and perform an action in response to the control signals. An output from the remote interface device is transmitted to the first and second channels and an output from each channel is received at the other channel. The control signals are based on the received signals, the received outputs from the remote interface device, and the received output from the other channel.

19 Claims, 6 Drawing Sheets

(56) References Cited

U.S. PATENT DOCUMENTS

| | | | |
|---|---|---|---|
| 2021/0162937 A1* | 6/2021 | Bamford | G05B 9/03 |
| 2021/0354843 A1 | 11/2021 | Guerchkovitch et al. | |
| 2021/0394896 A1 | 12/2021 | Kuang et al. | |
| 2022/0017208 A1 | 1/2022 | Spiegel et al. | |

* cited by examiner

AIRCRAFT HYBRID DUPLEX-TRIPLEX CONTROL ARCHITECTURE

CROSS-REFERENCE TO RELATED APPLICATIONS

This application claims the benefit of U.S. Provisional Application No. 63/330,418, filed Apr. 13, 2022, the disclosure of which is incorporated herein by reference in its entirety.

BACKGROUND

The subject matter disclosed herein generally relates to gas turbine engines and, more particularly, to hybrid duplex-triplex control architectures for aircraft.

Aircraft engines require highly reliable systems for control to ensure safe and efficient operation. Reliable control for more sophisticated gas turbine engines, and even some piston engines, is maintained, for example, by a Full Authority Digital Engine Control (FADEC). A FADEC receives cockpit commands in the form of a signal indicative of a performance and operational level required from an engine. The FADEC also receives signals from a variety of sensors and other systems around the engine and the aircraft providing information on state of the propulsion system (e.g., engine and control systems/subsystems), the aircraft, and/or operating envelop of the aircraft and/or propulsion system. The FADEC applies a set of control rules to the received signals and determines control signals to send to effectors on and around the engine. The control signals sent by the FADEC direct the effectors in such a way as to produce the required engine performance level and/or operating condition. The FADEC performs this control function many times per second.

It is desirable to design a FADEC to control a large variety of engines. In use, an individual FADEC must be configured for the combination airframe and actual engine it will control. In addition, the FADEC performs complex calculations based, in part, on sensor input from the airframe. Each airframe type to which an engine may be attached will have different sensors, both in quantity and type, and will have unique flight characteristics that require adjustment in the engine control calculations performed by the FADEC. The FADEC must be configured, or programmed, with control schedules for its specific engine/airframe combination. Storage memory for the control schedules for all foreseeable engine/airframe combinations for which the FADEC could be used can be allocated in the FADEC if the FADEC has sufficient data storage. A large engine can accommodate a large FADEC with room for such a large amount of data storage. The more complex the operation(s) to be performed by the FADEC and/or an increase in the number of inputs, may increase the complexity, costs, size, volume, and weight of the FADEC onboard an aircraft. Accordingly, improved FADEC and aircraft control systems may be desirable.

BRIEF DESCRIPTION

According to some embodiments, aircraft control architectures are provided. The aircraft control architectures include a triplex sensor configured to output three signals, a first channel configured to receive a first signal of the three output signals, the first channel comprising a first processor and output a first control signal, a second channel configured to receive a second signal of the three output signals, the second channel comprising a second processor and output a second control signal, a remote interface device configured to receive a third signal of the three output signals, and an effector configured to receive the first control signal and the second control signal and configured to perform an action in response to the first control signal and the second control signal. An output from the remote interface device is transmitted to each of the first channel and the second channel, an output from the first channel is received at the second channel and an output from the second channel is received at the first channel, the first control signal is based on the first signal, the output from the remote interface device, and the output from the second channel, and the second control signal is based on the second signal, the output from the remote interface device, and the output from the first channel.

In addition to one or more of the features described herein, or as an alternative, further embodiments of the aircraft control architectures may include that the effector is a duplex effector.

In addition to one or more of the features described herein, or as an alternative, further embodiments of the aircraft control architectures may include that at least one of the first channel and the second channel includes an analog-to-digital converter for receiving an analog signal from the triplex sensor and generating a digital signal, a digital circuit for processing the digital signal, a digital-to-analog converter for outputting an analog signal to the effector based on the processed digital signal, a processor for controlling operation of the digital circuit to generate the processed digital signal, and a power supply configured to supply power to at least the processor.

In addition to one or more of the features described herein, or as an alternative, further embodiments of the aircraft control architectures may include that the remote interface device includes an analog-to-digital converter for receiving an analog signal from the triplex sensor and generating a digital signal, a digital circuit for processing the digital signal, a digital-to-analog converter for outputting an analog signal to the effector based on the processed digital signal, and a programmable array configured to store instructions for the digital circuit to generate the digital signal.

In addition to one or more of the features described herein, or as an alternative, further embodiments of the aircraft control architectures may include that the effector is a triplex effector.

In addition to one or more of the features described herein, or as an alternative, further embodiments of the aircraft control architectures may include that the triplex effector receives as an input an output from the remote interface device.

In addition to one or more of the features described herein, or as an alternative, further embodiments of the aircraft control architectures may include that the remote interface device is a first remote interface device, the aircraft control architecture further includes a second remote interface device configured to receive as an input an output from the first channel and the second channel and output a signal to be sent to the triplex effector.

In addition to one or more of the features described herein, or as an alternative, further embodiments of the aircraft control architectures may include that the triplex sensor comprises at least one of a temperature sensor, a pressure sensor, a strain gauge, a speed sensor, an accelerometer, or a lube sensor.

In addition to one or more of the features described herein, or as an alternative, further embodiments of the aircraft control architectures may include that the effector is at least one of a motor, an actuator, a solenoid, a valve, a relay, a pump, or a heater.

According to some embodiments, aircraft are provided. The aircraft include an engine and an aircraft control architecture configured to control operation of the engine. The aircraft control architecture includes a triplex sensor configured to output three signals, a first channel configured to receive a first signal of the three output signals, the first channel comprising a first processor and output a first control signal, a second channel configured to receive a second signal of the three output signals, the second channel comprising a second processor and output a second control signal, a remote interface device configured to receive a third signal of the three output signals, and an effector configured to receive the first control signal and the second control signal and configured to perform an action in response to the first control signal and the second control signal. An output from the remote interface device is transmitted to each of the first channel and the second channel, an output from the first channel is received at the second channel and an output from the second channel is received at the first channel, the first control signal is based on the first signal, the output from the remote interface device, and the output from the second channel, and the second control signal is based on the second signal, the output from the remote interface device, and the output from the first channel.

In addition to one or more of the features described herein, or as an alternative, further embodiments of the aircraft may include that the effector is a duplex effector.

In addition to one or more of the features described herein, or as an alternative, further embodiments of the aircraft may include that at least one of the first channel and the second channel include an analog-to-digital converter for receiving an analog signal from the triplex sensor and generating a digital signal, a digital circuit for processing the digital signal, a digital-to-analog converter for outputting an analog signal to the effector based on the processed digital signal, a processor for controlling operation of the digital circuit to generate the processed digital signal, and a power supply configured to supply power to at least the processor.

In addition to one or more of the features described herein, or as an alternative, further embodiments of the aircraft may include that the remote interface device includes an analog-to-digital converter for receiving an analog signal from the triplex sensor and generating a digital signal, a digital circuit for processing the digital signal, a digital-to-analog converter for outputting an analog signal to the effector based on the processed digital signal, and a programmable array configured to store instructions for the digital circuit to generate the digital signal.

In addition to one or more of the features described herein, or as an alternative, further embodiments of the aircraft may include that the effector is a triplex effector.

In addition to one or more of the features described herein, or as an alternative, further embodiments of the aircraft may include that the triplex effector receives as an input an output from the remote interface device.

In addition to one or more of the features described herein, or as an alternative, further embodiments of the aircraft may include that the remote interface device is a first remote interface device, the aircraft control architecture further includes a second remote interface device configured to receive as an input an output from the first channel and the second channel and output a signal to be sent to the triplex effector.

In addition to one or more of the features described herein, or as an alternative, further embodiments of the aircraft may include that the triplex sensor comprises at least one of a temperature sensor, a pressure sensor, a strain gauge, a speed sensor, an accelerometer, or a lube sensor.

In addition to one or more of the features described herein, or as an alternative, further embodiments of the aircraft may include that the effector is at least one of a motor, an actuator, a solenoid, a valve, a relay, a pump, or a heater.

In addition to one or more of the features described herein, or as an alternative, further embodiments of the aircraft may include that the aircraft is configured to be operated by a single pilot.

According to some embodiments, methods for controlling operation of an aircraft are provided. The methods include sensing, with a triplex sensor, at least one parameter associated with the aircraft, transmitting a first analog signal from the triplex sensor to a first channel of an aircraft control architecture, transmitting a second analog signal from the triplex sensor to a second channel of the aircraft control architecture, transmitting a third analog signal from the triplex sensor to a remote interface device of the aircraft control architecture, receiving at the first channel the first analog signal, a digital signal from the second channel, and a digital signal from the remote interface device, receiving at the second channel the second analog signal, a digital signal from the first channel, and a digital signal from the remote interface device, processing, at each of the first channel and the second channel, the received signals in combination, and outputting from each of the first channel and the second channel an analog signal to control operation of an effector of the aircraft, wherein the output analog signals from the first channel and the second channel are based on the respective received signals at each channel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
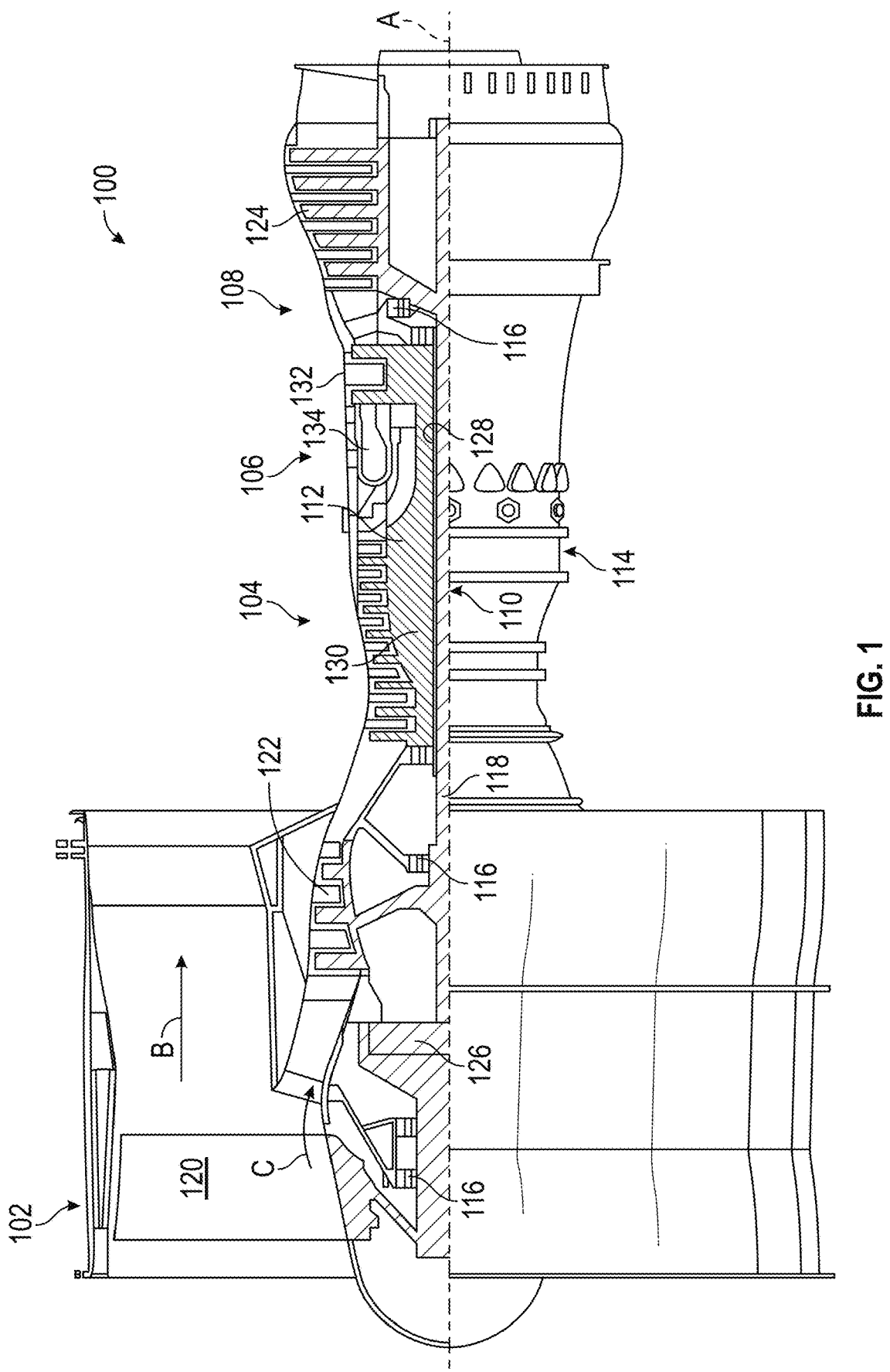
FIG. 1 is a schematic illustration of a gas turbine engine that may employ embodiments of the present disclosure.

A detailed description of one or more embodiments of the disclosed apparatus and method are presented herein by way of exemplification and not limitation with reference to the Figures. As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a gas turbine engine 100. The gas turbine engine 100 is disclosed herein as a two-spool turbofan that generally incorporates a fan section 102, a compressor section 104, a combustor section 106, and a turbine section 108. FIG. 1 is one example of a gas turbine engine that may incorporate embodiments of the present disclosure. However, alternative engine configurations that may incorporate embodiments described herein may include other systems, features, and/or arrangement of components, as will be appreciated by those of skill in the art. The fan section 102 is configured to drive air along a bypass flow path B in a bypass duct, while the compressor section 104 is configured to drive air along a core flow path C for compression and communication into the combustor section 106 then expansion through the turbine section 108. Although depicted as a two-spool turbofan gas turbine engine in the disclosed non-limiting embodiment, it should be understood that the concepts described herein are not limited to use with two-spool turbofans as the teachings may be applied to other types of turbine engines without departing from the scope of the present disclosure.

The gas turbine engine 100 generally includes a low speed spool 110 and a high speed spool 112, each spool mounted for rotation about an engine central longitudinal axis A relative to an engine static structure 114 via one or more bearing systems 116. It should be understood that various bearing systems 116 at various locations may alternatively or additionally be provided, and the location of such bearing systems may be varied as appropriate to the application and/or engine configuration.

The low speed spool 110 generally includes an inner shaft 118 that interconnects a fan 120, a low pressure compressor 122, and a low pressure turbine 124. The inner shaft 118 is connected to the fan 120 through a speed change mechanism, which in the configuration of the gas turbine engine 100 shown in FIG. 1 is illustrated as a geared architecture 126 to drive the fan 120 at a lower speed than the low speed spool 110. The high speed spool 112 includes an outer shaft 128 that interconnects a high pressure compressor 130 and high pressure turbine 132. A combustor 134 is arranged in the gas turbine engine 100 between the high pressure compressor 130 and the high pressure turbine 132. The engine static structure 114 is configured to support the bearing systems 116. The inner shaft 118 and the outer shaft 128 are concentric and rotate via the bearing systems 116 about the engine central longitudinal axis A which is collinear with their longitudinal axes.

In operation, the core airflow in the core airflow path C is compressed by the low pressure compressor 122, then the high pressure compressor 130, mixed and burned with fuel in the combustor 134, then expanded over the high pressure turbine 132, and finally the low pressure turbine 124. The turbines 134, 124 may be configured to rotationally drive the low speed spool 110 and the high speed spool 112, respectively, in response to the expansion of the core airflow along the core airflow path C. It will be appreciated that each of the positions of the fan section 102, the compressor section 104, the combustor section 106, the turbine section 108, and the fan drive gear system (e.g., geared architecture 126) may be varied relative to each other. For example, in some non-limiting configurations, the geared architecture 126 may be located aft of the combustor section 106 or even aft of the turbine section 108, and the fan section 102 may be positioned forward or aft of the location of the geared architecture 126.

The gas turbine engine 100, in one non-limiting example, is a high-bypass geared aircraft engine. In some examples, a bypass ratio of the gas turbine engine 100 may be greater than about six (6), with an example embodiment being greater than about ten (10). In some embodiments, the geared architecture 126 may be an epicyclic gear train, such as a planetary gear system or other gear system, with a gear reduction ratio of greater than about 2.3 (2.3:1). In some embodiments, the low pressure turbine 124 may have a pressure ratio that is greater than about five (5). In one embodiment, a bypass ratio of the gas turbine engine 100 may be greater than about ten (10:1). In some embodiments, a diameter of the fan 120 may be significantly larger than that of the low pressure compressor 122. In some embodiments, the low pressure turbine 124 may have a pressure ratio that is greater than about five (5:1). A pressure ratio of the low pressure turbine 124 is a pressure measured prior to an inlet of low pressure turbine 124 as related to a pressure at the outlet of the low pressure turbine 124 prior to an exhaust nozzle or other downstream component. It should be understood that the above parameters are only exemplary of one embodiment of a geared architecture engine and that the present disclosure is applicable to other gas turbine engines including, but not limited to, direct drive turbofans.

In some embodiments, a significant amount of thrust is provided by the bypass flow B due to a high bypass ratio. The fan section 102 of the gas turbine engine 100 may be designed for particular flight condition(s)—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec). the gas turbine engine 100 of FIG. 1 may be configured with one or more components as shown and described herein.

Figure 2:
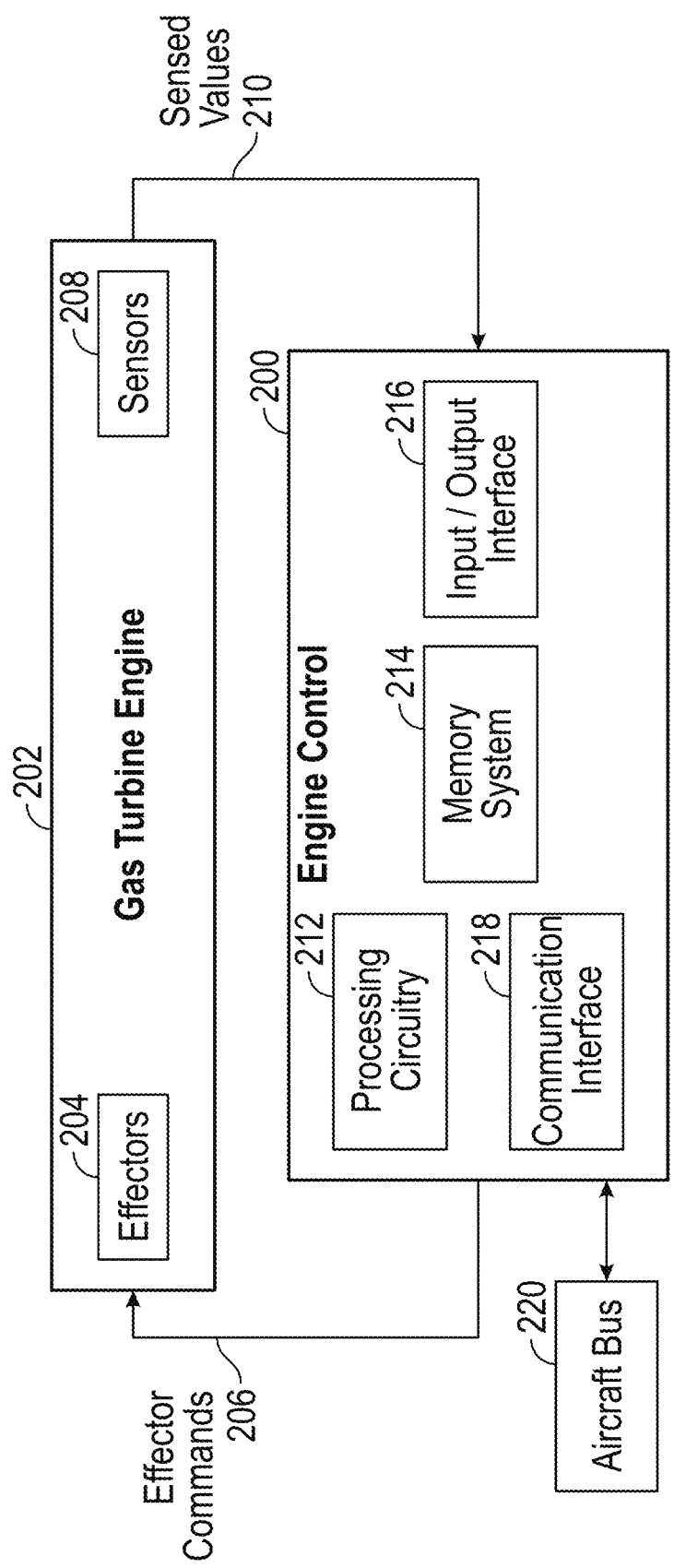
FIG. 2 is a schematic diagram of control system for use onboard an aircraft.

Referring now to FIG. 2, a schematic diagram of an engine control 200 that may incorporate embodiments of the present disclosure is shown. The engine control 200 may be configured to monitor and control operation of a gas turbine engine 202 in real-time. The gas turbine engine 202 may be similar to that shown and described with respect to FIG. 1. The engine control 200 can control effectors 204 of the gas turbine engine 202 by generating one or more effector commands 206. Examples of effectors 204 can include, for example and without limitation, one or more motors, actuators, solenoids, valves, relays, pumps, heaters, and/or other such actuation control components, as will be appreciated by those of skill in the art. A plurality of sensors 208 can capture state data associated with the gas turbine engine 202 and provide sensed values 210 as feedback to the engine control 200 for fault monitoring and/or for closed-loop control of the gas turbine engine 202 according to one or more control laws. Examples of the sensors 208 can include, without limitation, temperature sensors, pressure sensors, strain gauges, speed sensors, accelerometers, lube sensors, and the like, as will be appreciated by those of skill in the art.

In some embodiments, the engine control 200 can be a full authority digital engine control (FADEC) that includes processing circuitry 212 and a memory system 214 configured to store a plurality of configuration items, where at least one of the configuration items includes a sequence of the computer executable instructions for execution by the processing circuitry 212. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 202. The processing circuitry 212 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 214 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 200 can also include one or more of an input/output interface 216, a communication interface 218, and/or other elements. The input/output interface 216 can include support circuitry for interfacing with the effectors 204 and the sensors 208. For example, the input/output interface 216 can include, for example, filters, amplifiers, digital-to-analog converters, analog-to-digital converters, and other such circuits to support digital and/or analog interfaces. Further, the input/output interface 216 can receive or output signals to/from other sources, such as discrete inputs/outputs and/or status signals. The communication interface 218 may communicate with an aircraft bus 220 of an aircraft. The aircraft bus 220 can provide aircraft-level parameters and commands that are used by the engine control 200 to control the gas turbine engine 202 in real-time. The communication interface 218 may also support communication with other components, such as other instances of the engine control 200, storage units, diagnostic units, communication adapters, off-board systems, and the like.

The engine control 200 may be configured to aid in operation of the aircraft. For example, the engine control 200 may be configured to perform certain automated tasks to aid a pilot in controlling and operating an aircraft that include the gas turbine engine 202.

A FADEC system includes a digital computer (e.g., electronic engine controller (EEC) or engine control unit (ECU)) and related accessories that control all aspects of aircraft engine performance (e.g., sensors and/or actuators). Onboard aircraft, a FADEC can provide digital engine control with no manual override available, placing full authority over the operating parameters of the engine in the hands of the computer. Typically, if a FADEC failure occurs, the engine fails. If the engine is controlled digitally and electronically but allows for manual override, it is considered solely an EEC or ECU. An EEC, though a component of a FADEC, is not by itself a FADEC. When standing alone, the EEC makes all of the decisions until the pilot wishes to intervene.

A FADEC works by receiving multiple input variables of current flight condition including, for example and without limitation, air density, throttle lever position, engine temperatures, engine pressures, and many other parameters. The input data to the FADEC may be received from one or more associated sensors that are arranged to monitor one or more aspects of an engine and/or aircraft operation. The inputs are received by the EEC at the FADEC for analysis. Engine operating parameters such as, and without limitation, fuel flow, stator vane position, bleed valve position, and others are computed from this data and applied as appropriate. In some configurations, the FADEC may be configured to control engine starting and restarting. The basic purpose of a FADEC is to provide optimum engine efficiency for a given flight condition. The FADEC not only provides for efficient engine operation but impose or control operation relative to engine limitations that are part of the EEC and/or FADEC programming. In some configurations, the FADEC may be configured to receive engine health and maintenance reports from various sensors and/or other electronic or computer systems associated with the engine and/or aircraft. For example, to avoid exceeding a certain engine temperature, the FADEC can be programmed to automatically take the necessary measures without pilot intervention.

One of the functions of a FADEC or EEC/ECU is to monitor for faults and take appropriate action related to a fault. The fault can take the form of a failed component, a failed sensor, or issues related with data processing. Accordingly, fault detection is necessary to monitor signals and/or data to determine a fault has occurred and what action is appropriate to respond to a fault. In some engine and/or aircraft operations, such as having two operators (e.g., pilot and co-pilot), a decision may be made by the operators once a fault is detected.

Figure 3:
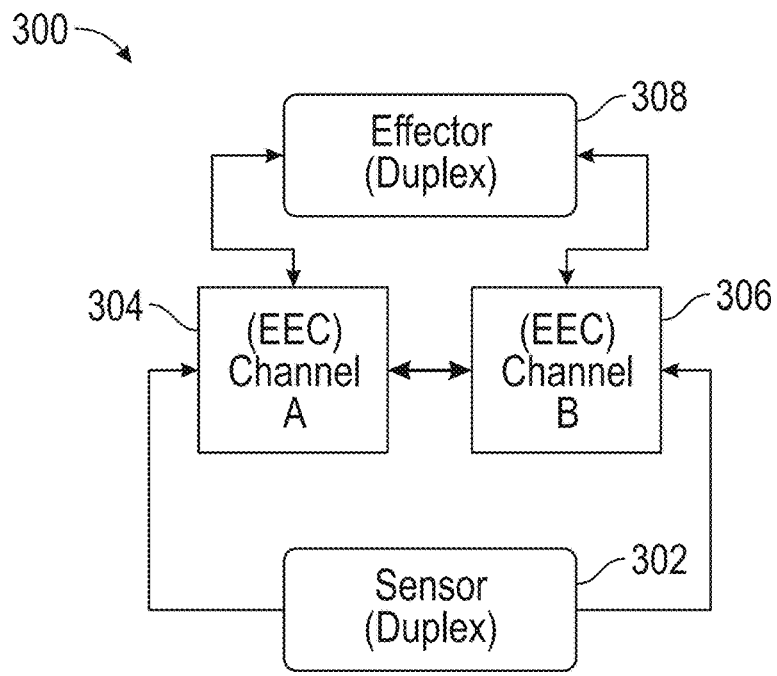
FIG. 3 is a schematic diagram of an aircraft control architecture having a duplex configuration.

Turning now to FIG. 3, a schematic diagram of a conventional duplex architecture 300 is illustratively shown. The duplex architecture 300 represents a portion of a control system of an aircraft, such as shown and described above. In the duplex architecture 300, a duplex sensor 302 is arranged to collect data from one or more onboard systems of an aircraft. Examples of the duplex sensor 302 can include, without limitation, temperature sensors, pressure sensors, strain gauges, speed sensors, accelerometers, lube sensors, and the like, as will be appreciated by those of skill in the art. The duplex sensor 302 is configured to output an analog signal that is transmitted to two separate channels 304, 306. As shown, a first channel 304 is labeled Channel A and a second channel 306 is labeled Channel B. Each channel 304, 306 includes a processor and associated electronics such as analog-to-digital (A/D) converters and digital-to-analog (D/A) converters. As used herein, the term processor refers to an electrical component that includes complex electronic hardware and software. Accordingly, the processors, as employed herein, may include circuitry and/or onboard software that is configured to receive data, process such data, make decisions based on such processed data, and output controls based on the processed data and/or decisions. The decisions of the processors may be complex control outputs regarding operation of an engine onboard an aircraft and are designed to control operation of one or more effectors.

In operation, each of the first channel 304 and the second channel 306 receive an analog signal from the duplex sensor 302. In one non-limiting embodiment of operation, the first channel 304 receives a first analog signal from the duplex sensor 302. At the first channel 304, the analog signal is converted to a digital signal using an A/D converter. The processor of the first channel 304 is then configured to analyze and/or otherwise process the digital signal to determine an appropriate response to the received information from the duplex sensor 302. Similarly, the second channel 306 receives a second analog signal from the duplex sensor 302. At the second channel 306, the analog signal is converted to a digital signal using an A/D converter. The processor of the second channel 306 is then configured to analyze and/or otherwise process the digital signal to determine an appropriate response to the received information from the duplex sensor 302. In some embodiments, digital information may be exchanged between the first channel 304 and the second channel 306, in order to check and ensure no errors in the data are present. Such errors in the data may represent faults at the duplex sensor 302, for example. As shown, each channel 304, 306 has two main inputs related to sensor data, a first input being the analog input from the duplex sensor 302 and the second being a digital input from the other channel 304, 306.

The channels 304, 306 are each operably coupled to one or more duplex effectors 308. Based on the information received from the duplex sensor 302 and the processing at each of the channels 304, 306, each channel 304, 306 can output a control signal to a duplex effector 308. The duplex effectors 308 may be components or systems onboard an aircraft for performing an operation and/or actuating, for example. The output from the channels 304, 306 may be an analog signal (e.g., voltage or the like) that is transmitted to the duplex effector 308 to cause a change in state (e.g., actuation) of the duplex effector 308. The analog output from the channels 304, 306 may be an analog signal that is generated using an onboard A/D converter of the respective channel 304, 306. In some embodiments, the channels 304, 306 may be configured to receive feedback or other information or signals from the duplex effector 308.

When a fault may be present, the first and second channels 304, 306 are used to compare the signals and determine that such a fault is occurring, and then determine an appropriate action. However, in a two-channel system, such as shown in FIG. 3, certain faults may be missed due to a fault being in-range of typical operating parameters. For example, models stored onboard the processors of the channels 304, 306 may not be robust enough to isolate a faulty in-range signal. That is, duplex systems may be susceptible to in-range faults, and thus a third input may be provided to isolate a failed signal.

Figure 4:
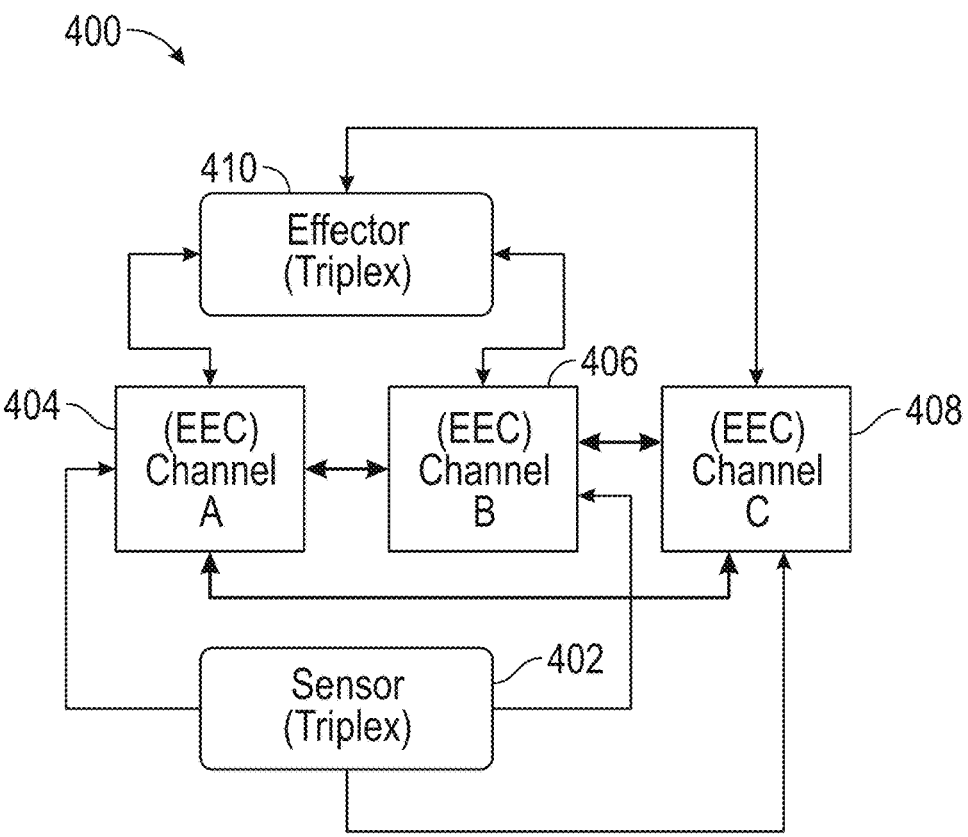
FIG. 4 is a schematic diagram of an aircraft control architecture having a triplex configuration.

Turning now to FIG. 4, a schematic diagram of a conventional triplex architecture 400 is illustratively shown. The triplex architecture 400 represents a portion of a control system of an aircraft, such as shown and described above. In the triplex architecture 400, a triplex sensor 402 is arranged to collect data from one or more onboard systems of an aircraft, as described above. The triplex sensor 402 is configured to output an analog signal that is transmitted to three separate channels 404, 406, 408. As shown, a first channel 404 is labeled Channel A, a second channel 406 is labeled Channel B, and a third channel 408 is labeled Channel C. Each channel 304, 306 includes a processor and associated electronics such as A/D converters and D/A converters. As shown, each channel 404, 406, 406 has three main inputs related to sensor data, a first input being the analog input from the triplex sensor 402 and the second and third being a digital inputs from the other channels 404, 406, 408.

The channels 404, 406, 408 are each operably coupled to a triplex effector 410 that is configured to respond to signals received from the channels 404, 406, 408. As shown, each of the channels 404, 406, 408 may receive a separate signal from the triplex sensor 402. Further, each channel 404, 406, 408 may be configured to communicate between the other channels 404, 406, 408. Additionally, each channel 404, 406, 408 may be configured to output a signal to the triplex effector 410 and may be configured to receive information from the triplex effector 410.

The inclusion of the third channel 408 provides for increased fault detection, including faults that are in-range. As such, the triplex architecture 400 illustrated in FIG. 4 is more robust than the duplex architecture 300 of FIG. 3. However, through the inclusion of the third channel 408, the complexity of the system is greatly increased. For example, each channel 404, 406, 408 includes associated electronics including a processor (e.g., EEC, ECU) along with associated A/D/D/A converters. Additionally, each channel 404, 406, 408 is a powered component. Through the inclusion of the third channel 408, the fault detection capability of the system is greatly increased, thus preventing issues associated with faults, including faults that occur within normal operating parameters, which could be missed in a duplex architecture.

This increased capability is achieved, in part, due to the cross-communication between each of the channels 404, 406, 408. As such, a distributed control architecture is provided through the triplex system. In such configurations, the input processing is a triplex configuration (e.g., three separate signals from the triplex sensor 402 to each channel 404, 406, 408). Further, the control processing (i.e., outputs) is also triplex in nature, with each channel 404, 406, 408 outputting a command or signal to the triplex effector 410. Because each channel 404, 406, 408 includes a dedicated or discrete processor (e.g., three individual EEC/ECUs), the complexity of the system is greatly increased. As a result, such triplex systems may be expensive and difficult to implement, while also increasing the total number of components in an aircraft control system.

In view of the above, in accordance with embodiments of the present disclosure, hybrid duplex-triplex architectures are provided. To improve the robustness of fault detection onboard aircraft, the addition of a third/triplex set of inputs is desirable to address in-range failures, particularly when models are not robust enough to isolate a faulty in-range signal in a duplex architecture. As noted above, duplex systems are susceptible to in-range faults and a third input needs to be created/synthesized to isolate a failed signal. Embodiments of the present disclosure are directed to a hybrid architecture where control processing is duplex (e.g., two EEC/ECU), but input processing is expanded to triplex by using a remote interface device (e.g., data concentrator, remote input/output (RIO)). In accordance with some embodiments of the present disclosure, the remote interface device is configured to provide a third set of inputs to two processing channels, thus hybridizing duplex and triplex systems. Such systems can increase operational complexity without increasing other aspects of conventional duplex systems (e.g., without significantly increasing the processing components and/or adding additional channels and the like). That is, in some embodiments, such a hybrid system related to three inputs, but two processing channels would not require changing current duplex architectures for control outputs (e.g., duplex output to an effector). As such, in accordance with some embodiments of the present disclosure, the main processors and control output drivers would remain a duplex architecture. This results in a control architecture being a hybrid duplex-triplex configuration.

Figure 5:
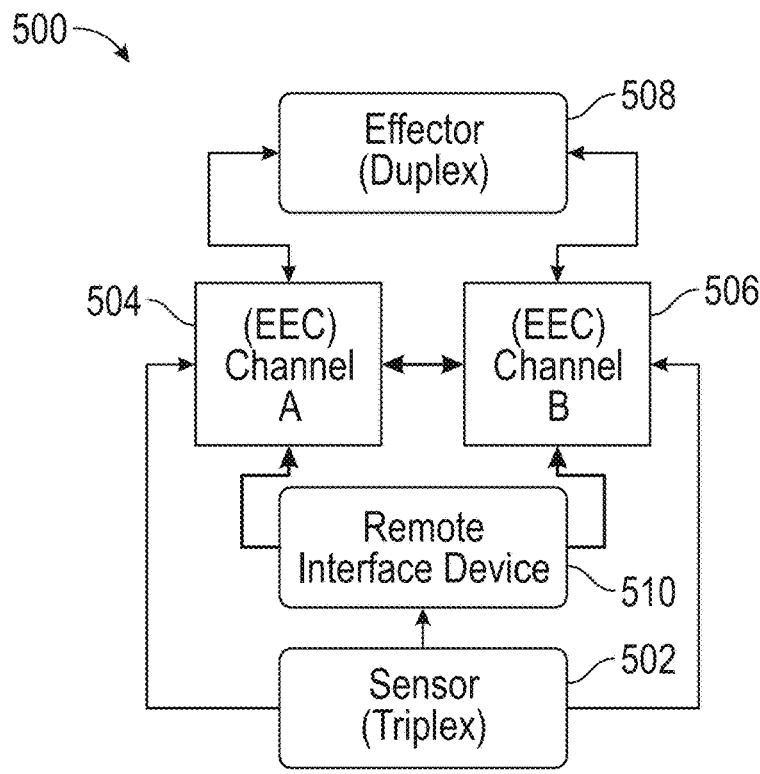
FIG. 5 is a schematic diagram of an aircraft control architecture in accordance with an embodiment of the present disclosure having a hybrid duplex-triplex configuration.

Turning now to FIG. 5, a schematic diagram of an aircraft control architecture 500 in accordance with an embodiment of the present disclosure is illustratively shown. The aircraft control architecture 500 represents a portion of a control system of an aircraft, such as shown and described above. The aircraft control architecture 500, of this embodiment, is a hybrid architecture, having a triplex input configuration and a duplex output configuration, using only two channels.

As shown, in the aircraft control architecture 500, a triplex sensor 502 is arranged to collect data from one or more onboard systems of an aircraft. The triplex sensor 502 is configured to output an analog signal that is transmitted to two separate channels 504, 506. As shown, a first channel 504 is labeled Channel A and a second channel 506 is labeled Channel B. Each channel 504, 506 includes a processor and associated electronics such as analog-to-digital (A/D) converters and digital-to-analog (D/A) converters. The output from the two channels 504, 506 is sent to a duplex effector 508.

The aircraft control architecture 500 further includes a remote interface device 510. The remote interface device 510 is configured to receive an input from the triplex sensor 502 and convert said signal to a digital signal which is sent to each of the channels 504, 506. This results in each channel 504, 506 receiving three inputs, rather than two, as done in a conventional duplex system. For example, the first channel 504 receives an analog input from the triplex sensor 502, a digital input from the second channel 506, and a digital input from the remote interface device 510. The respective channel 504, 506 may then perform analysis of the three signals to determine an appropriate response or action to be output and performed by the duplex effector 508.

In accordance with embodiments of the present disclosure, the remote interface device 510 does not include a processor, but rather merely includes A/D and D/A converters for receiving an analog signal from the triplex sensor 502 and output a digital signal to be sent to each of the first channel 504 and the second channel 506. As such, the remote interface device 510 may be a relatively simple electronic device that is configured to generate a third signal for fault detection at the channels 504, 506, without requiring the additional processor and associated electronics that add complexity to the triplex systems described above.

Because of the transition to using a remote interface device, embodiments of the present disclosure include a hybrid processing of the obtained data and outputs therefrom. For example, the processing architecture and software described herein is operated in a mode where the input fault detection, selection, and accommodation functions have three inputs (e.g., triplex) that is processed using duplex software and processing architecture. Similarly, the output functions are performed by duplex software and processing architecture that drives control effectors with triplex electromechanical interfaces. That is, not only are the electrical/mechanical aspects of embodiments of the present disclosure a hybrid system, the processing and software associated with embodiments of the present disclosure is also hybrid, where triplex data is processed in a duplex software and the output from such duplex software processing of triplex inputs outputs triplex control to triplex effectors and the like.

Figure 6:
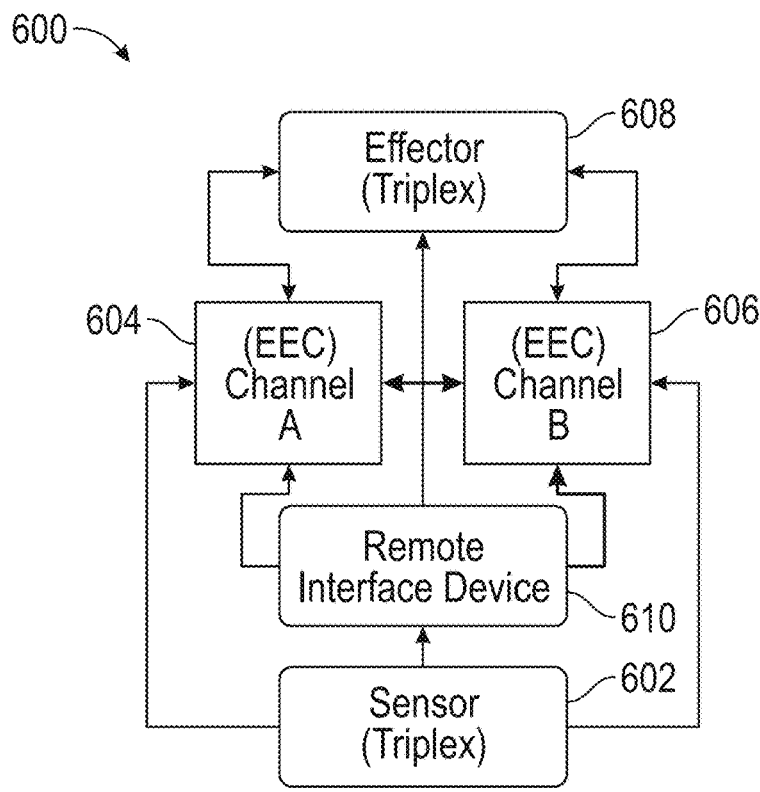
FIG. 6 is a schematic diagram of an aircraft control architecture in accordance with an embodiment of the present disclosure having a hybrid duplex-triplex configuration.

Turning now to FIG. 6, a schematic diagram of an aircraft control architecture 600 in accordance with an embodiment of the present disclosure is illustratively shown. The aircraft control architecture 600 represents a portion of a control system of an aircraft, such as shown and described above. The aircraft control architecture 600, of this embodiment, is a hybrid architecture, having a triplex input configuration and a triplex output configuration, using only two channels.

As shown, in the aircraft control architecture 600, a triplex sensor 602 is arranged to collect data from one or more onboard systems of an aircraft. The triplex sensor 602 is configured to output an analog signal that is transmitted to two separate channels 604, 606, and a remote interface device 610. Outputs from the channels 604, 606 and the remote interface device 610 are sent to a triplex effector 608. As shown, a first channel 604 is labeled Channel A and a second channel 606 is labeled Channel B. Each channel 604, 606 includes a processor and associated electronics such as analog-to-digital (A/D) converters and digital-to-analog (D/A) converters. The output from the two channels 604, 606 is sent to the triplex effector 608. The triplex effector 608 also receives, as input, an output from the remote interface device 610. As such, the triplex effector 608 receives three inputs. However, it is noted that the remote interface device 610 does not include a processor, and thus merely transfers a signal along to the triplex effector 608 directly from the remote interface device 610. Such a configuration uses two channels (channels 604, 606) in a triplex system having the triplex sensor 602 and the triplex effector 608, without adding the complexity of a third channel to the system.

Figure 7:
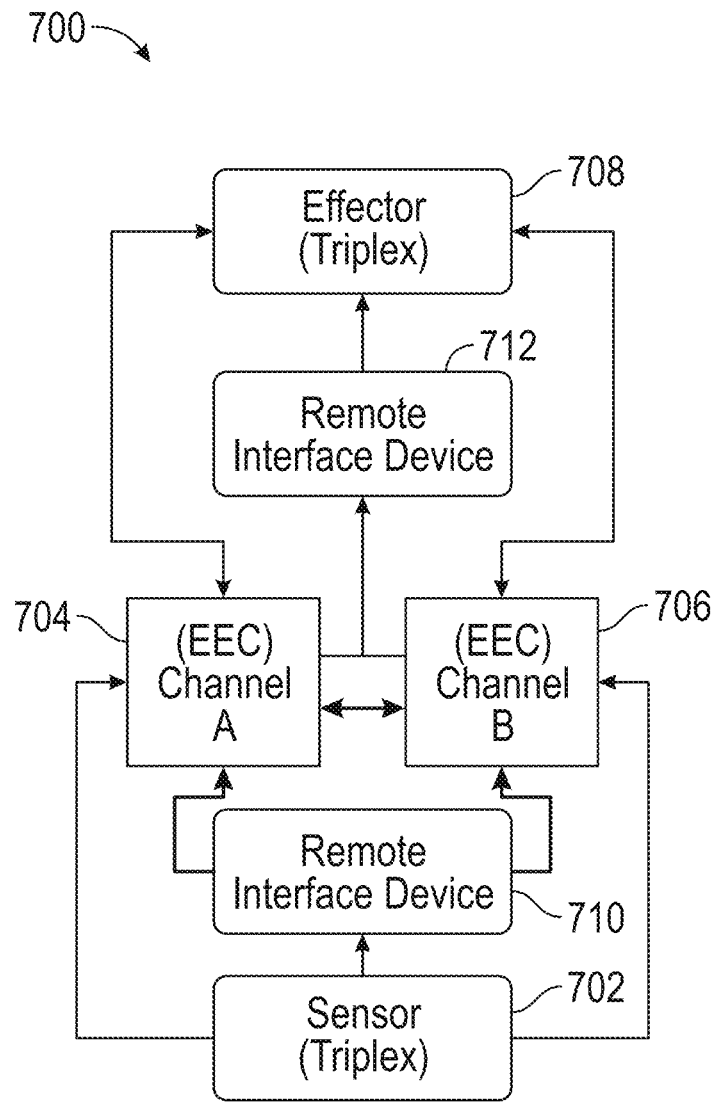
FIG. 7 is a schematic diagram of an aircraft control architecture in accordance with an embodiment of the present disclosure having a hybrid duplex-triplex configuration.

Turning now to FIG. 7, a schematic diagram of an aircraft control architecture 700 in accordance with an embodiment of the present disclosure is illustratively shown. The aircraft control architecture 700 represents a portion of a control system of an aircraft, such as shown and described above. The aircraft control architecture 700, of this embodiment, is a hybrid architecture, having a triplex input configuration and a triplex output configuration, using two channels and two remote interface devices.

As shown, in the aircraft control architecture 700, a triplex sensor 702 is arranged to collect data from one or more onboard systems of an aircraft. The triplex sensor 702 is configured to output an analog signal that is transmitted to two separate channels 704, 706, and two remote interface devices 710, 712. As shown, a first channel 704 is labeled Channel A and a second channel 706 is labeled Channel B. Each channel 704, 706 includes a processor and associated electronics such as analog-to-digital (A/D) converters and digital-to-analog (D/A) converters. The output from the two channels 704, 706 is sent to a triplex effector 708.

In this configuration, a first remote interface device 710 is configured to receive as input an output from the triplex sensor 702 and output a digital signal that is transmitted to each of the channels 704, 706 for the purpose of fault detection and the like. Further, the aircraft control architecture 700 of this embodiment includes a second remote interface device 712 that receives as an input an output from the two channels 704, 706. The second remote interface device 712 then outputs a signal to the triplex effector 708. As such, the triplex effector 708 receives three inputs. However, it is noted that neither the first nor second remote interface devices 710, 712 include a processor, and thus merely transfers a signal along the illustrated communication paths. Such a configuration uses two channels (channels 704, 706) in a triplex system having the triplex sensor 702 and the triplex effector 708, without adding the complexity of a third channel to the system.

Figure 8:
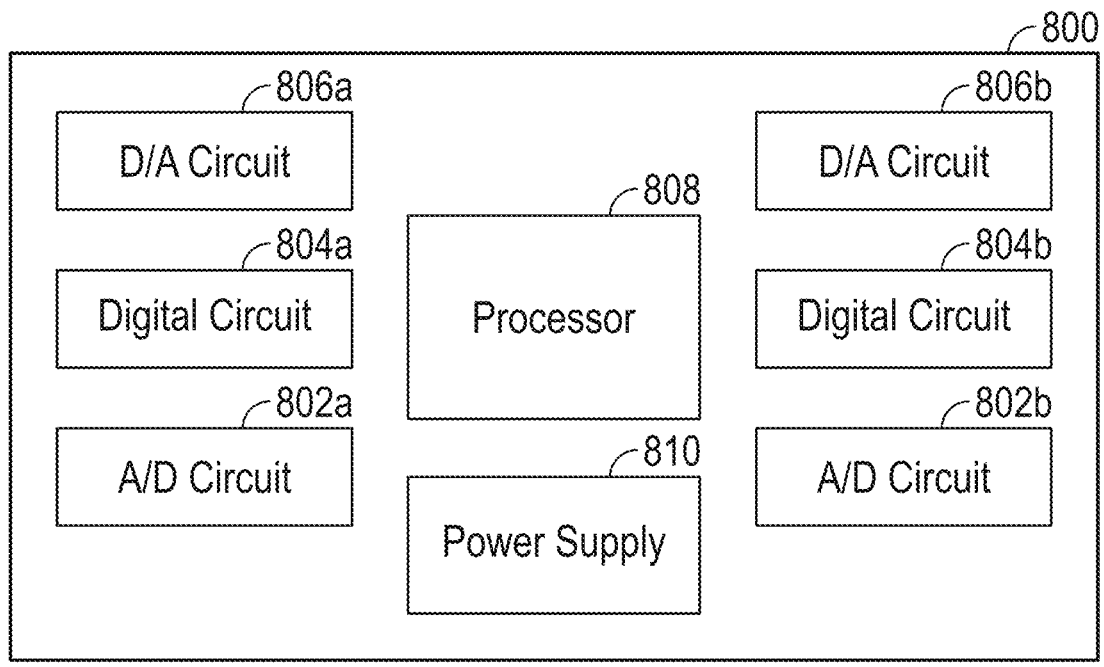
FIG. 8 is a schematic diagram of a controller for use in an aircraft control architecture in accordance with an embodiment of the present disclosure.

Turning now to FIG. 8, a schematic illustration of a controller 800 in accordance with an embodiment of the present disclosure is shown. The controller 800 is representative of the channels shown and described above. The controller 800 may be configured to receive analog inputs at respective A/D circuits 802a, 802b that are configured to convert a digital signal, such as received from a sensor, into a digital signal. The digital signal from each A/D circuit 802a, 802b is processed in a respective digital circuit 804a, 804b. The output from the digital circuits 804a, 804b is sent to a respective D/A circuit 806a, 806b for transmission to an associated effector. The processing of the digital signals within the controller 800 is performed and controlled using an onboard processor 808. The process 808 may be formed of complex hardware and software, as will be appreciated by those of skill in the art. Because complex computing is required to be performed using the processor 808 and the digital circuits 804a, 804b, a power supply 810 is required to power the controller 800. As such, the controller 800 is a powered electronic device. In some embodiments, the power supply 810 may be an onboard power supply, such as a battery or the like. The power supply 810 may be configured to supply electrical power to the processor 808 and the circuits 802a,b, 804a,b, 806a,b, of the controller 800. In other configurations, the power supply 810 may be a power input that is configured to receive electrical power from another location onboard an engine or aircraft. The inclusion of the processor 808 and the power supply 810 can greatly increase the weight, size, and complexity of the controller 800. Although shown with pairs of components (e.g., A/D circuits, Digital Circuits, and D/A circuits), it will be appreciated that any number of components of each set may be employed without departing from the scope of the present disclosure.

Figure 9:
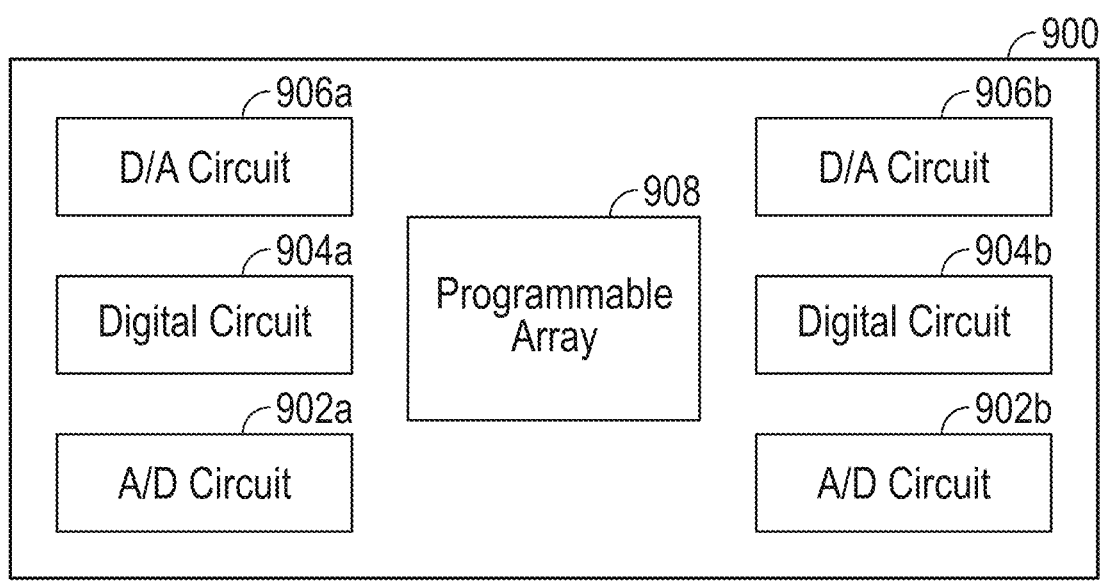
FIG. 9 is a schematic diagram of a remote interface device for use in an aircraft control architecture in accordance with an embodiment of the present disclosure.

Turning now to FIG. 9, a schematic illustration of a remote interface device 900 in accordance with an embodiment of the present disclosure is shown. The remote interface device 900 is representative of the remote interface devices shown and described above. The remote interface device 900 may be configured to receive analog inputs at respective A/D circuits 902a, 902b that are configured to convert a digital signal, such as received from a sensor, into a digital signal. The digital signal from each A/D circuit 902a, 902b is processed in a respective digital circuit 904a, 904b. The output from the digital circuits 904a, 904b is sent to a respective D/A circuit 906a, 906b for transmission to an associated effector. In this configuration, rather than a processor and power supply, the remote interface device 900 includes a programmable array 908. The programmable array 908 may configured with pre-installed software that is configured to direct processing without analysis. Because a simple programmable array 908 is employed, no additional power and/or processing circuitry is required. That is, the power and/or processing may be provided by other elements, such as other power conditioning circuits within a FADEC, and no dedicated or discrete power source is required for the remote interface device 900.

In some embodiments, the programmable array 908 may include a number of logic circuits and gates. It will be appreciated that the programmable array 908 may be a programmable logic array (PLA) that is a general purpose integrated circuit. The PLA may have a large number of logic circuits consisting of logic gates (e.g., AND, OR, NAND, NOR) that can be wired as desired. The PLA may be designed to provide both normal and complement of all inputs. A traditional logic circuit has physical connection between inputs and the logic gates (e.g., AND, OR, and others) used to process the input signals and generate combinatorial output signals. A traditional approach is to physically connect using wires. However, PLAs do not have the physical hardwired connection. In the case of PLAs, the connections between normal inputs/complements of inputs and various logic gates (e.g., ANDs, ORs, NANDs, NORs) are made through programming (software). Thus, the PLA provides input processing connections that can be configured. Many of the logical processing that has to be done by a computer processor can be performed using a simple PLA. A PLA processing is faster than a CPU (e.g., as compared to controller 800 and processor 808) because the PLA does not involve processing and decoding program instructions, as in the case of a CPU. A PLA is a passive device while a CPU is an active device. A PLA that is programmable in the field is called an FPGA (Field Programmable Gate Array), and, in some embodiments, the programmable array 908 may be an FPGA.

Advantageously, embodiments of the present disclosure provide for a hybrid duplex-triplex architecture for aircraft and engine control. The hybrid duplex-triplex concepts described herein may minimize the cost, weight, and complexity and/or risk penalties of a triplex architecture (as compared to a duplex system) while providing an architecture that is robust to in-range faults (as compared to a duplex system). As discussed above, employing a fully triplex system is far more complicated and costly than a duplex system because such triplex systems require control techniques to arbitrate between three controllers. The additional hardware makes a triplex system costlier and heavier than a duplex system. Further, such triplex systems incorporate additional weight and volume constraints due to the inclusion of a third processor and associated power and circuitry. This is especially true for the main processing architecture. Advantageously, the hybrid architectures described herein allow for the introduction of distributed control architecture which facilitate incorporating the advantages of distributed systems (e.g., triplex systems), while substantially maintaining the simple electrical systems of a duplex system.

Further, there may be a desire to reduce the number of human operators onboard aircraft. Currently, cockpits of commercial aircraft have at least two operators (e.g., pilot and co-pilot). In normal flight, the human operators may function as a third check on faults or the like, that may be detected or sensed at a by a FADEC. However, there may be advantages to operating an aircraft with a single pilot operator. In considering the potential implications of single pilot operation (SPO), the functions performed by the pilot need to be automated, both to reduce pilot workload and in consideration of pilot incapacitation. Currently the pilot is responsible for making decisions when failures of the FADEC occur, mainly concerning decisions to manage engine thrust and whether to shut the engine down. However, through the inclusion of the remote interface devices described herein, more of the flight operations may be controlled through a hybrid duplex-triplex systems, as described herein. In some embodiments, triplex sensors may be configured and employed with only two channels, rather than the conventional three channels in a triplex system (e.g., FIG. 4). Further, in some embodiments, triplex effectors may be controlled from a duplex channel system, through the inclusion of one or more remote interface devices, as described above.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft control architecture comprising:
    a triplex sensor configured to output three signals;
    a first channel configured to receive a first signal of the three output signals, the first channel comprising a first processor and output a first control signal;
    a second channel configured to receive a second signal of the three output signals, the second channel comprising a second processor and output a second control signal;
    a remote interface device configured to receive a third signal of the three output signals; and
    an effector configured to receive the first control signal and the second control signal and configured to perform an action in response to the first control signal and the second control signal,
    wherein an output from the remote interface device is transmitted to each of the first channel and the second channel,
    wherein an output from the first channel is received at the second channel and an output from the second channel is received at the first channel,
    wherein the first control signal is based on the first signal, the output from the remote interface device, and the output from the second channel, and
    wherein the second control signal is based on the second signal, the output from the remote interface device, and the output from the first channel.

2. The aircraft control architecture of claim 1, wherein the effector is a duplex effector.

3. The aircraft control architecture of claim 1, where at least one of the first channel and the second channel comprise:
    an analog-to-digital converter for receiving an analog signal from the triplex sensor and generating a digital signal;
    a digital circuit for processing the digital signal;
    a digital-to-analog converter for outputting an analog signal to the effector based on the processed digital signal;
    a processor for controlling operation of the digital circuit to generate the processed digital signal; and
    a power supply configured to supply power to at least the processor.

4. The aircraft control architecture of claim 1, wherein the remote interface device comprises:
    an analog-to-digital converter for receiving an analog signal from the triplex sensor and generating a digital signal;
    a digital circuit for processing the digital signal;
    a digital-to-analog converter for outputting an analog signal to the effector based on the processed digital signal; and
    a programmable array configured to store instructions for the digital circuit to generate the digital signal.

5. The aircraft control architecture of claim 1, wherein the effector is a triplex effector.

6. The aircraft control architecture of claim 5, wherein the triplex effector receives as an input an output from the remote interface device.

7. The aircraft control architecture of claim 5, wherein the remote interface device is a first remote interface device, the aircraft control architecture further comprising:
    a second remote interface device configured to receive as an input an output from the first channel and the second channel and output a signal to be sent to the triplex effector.

8. The aircraft control architecture of claim 1, wherein the triplex sensor comprises at least one of a temperature sensor, a pressure sensor, a strain gauge, a speed sensor, an accelerometer, or a lube sensor.

9. The aircraft control architecture of claim 1, wherein the effector is at least one of a motor, an actuator, a solenoid, a valve, a relay, a pump, or a heater.

10. An aircraft comprising:
    an engine; and
    an aircraft control architecture configured to control operation of the engine, the aircraft control architecture comprising:
        a triplex sensor configured to output three signals;
        a first channel configured to receive a first signal of the three output signals, the first channel comprising a first processor and output a first control signal;

a second channel configured to receive a second signal of the three output signals, the second channel comprising a second processor and output a second control signal;

a remote interface device configured to receive a third signal of the three output signals; and an effector configured to receive the first control signal and the second control signal and configured to perform an action in response to the first control signal and the second control signal, wherein an output from the remote interface device is transmitted to each of the first channel and the second channel, wherein an output from the first channel is received at the second channel and an output from the second channel is received at the first channel, wherein the first control signal is based on the first signal, the output from the remote interface device, and the output from the second channel, and wherein the second control signal is based on the second signal, the output from the remote interface device, and the output from the first channel.

11. The aircraft of claim 10, wherein the effector is a duplex effector.

12. The aircraft of claim 10, where at least one of the first channel and the second channel comprise:

an analog-to-digital converter for receiving an analog signal from the triplex sensor and generating a digital signal;

a digital circuit for processing the digital signal;

a digital-to-analog converter for outputting an analog signal to the effector based on the processed digital signal;

a processor for controlling operation of the digital circuit to generate the processed digital signal; and a power supply configured to supply power to at least the processor.

13. The aircraft of claim 10, wherein the remote interface device comprises:

an analog-to-digital converter for receiving an analog signal from the triplex sensor and generating a digital signal;

a digital circuit for processing the digital signal;

a digital-to-analog converter for outputting an analog signal to the effector based on the processed digital signal; and a programmable array configured to store instructions for the digital circuit to generate the digital signal.

14. The aircraft of claim 10, wherein the effector is a triplex effector.

15. The aircraft of claim 14, wherein the triplex effector receives as an input an output from the remote interface device.

16. The aircraft of claim 14, wherein the remote interface device is a first remote interface device, the aircraft control architecture further comprising:

a second remote interface device configured to receive as an input an output from the first channel and the second channel and output a signal to be sent to the triplex effector.

17. The aircraft of claim 10, wherein the triplex sensor comprises at least one of a temperature sensor, a pressure sensor, a strain gauge, a speed sensor, an accelerometer, or a lube sensor.

18. The aircraft of claim 10, wherein the effector is at least one of a motor, an actuator, a solenoid, a valve, a relay, a pump, or a heater.

19. The aircraft of claim 10, wherein the aircraft is configured to be operated by a single pilot.

* * * * *